(12) United States Patent
Hartmann et al.

(10) Patent No.: US 6,517,710 B2
(45) Date of Patent: Feb. 11, 2003

(54) STRUCTURAL ASSEMBLY WITH AN OIL FILTER FOR AN INTERNAL COMBUSTION ENGINE

(75) Inventors: Roland Hartmann, Steinheim (DE); Hans-Werner Holch, Heilbronn (DE); Herbert Jainek, Heilbronn (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 1 day.

(21) Appl. No.: 09/910,001

(22) Filed: Jul. 23, 2001

(65) Prior Publication Data

US 2002/0023614 A1 Feb. 28, 2002

(30) Foreign Application Priority Data

Jul. 22, 2000 (DE) .......................... 200 12 736

(51) Int. Cl.$^7$ .......................... B01D 27/08; B01D 35/02; F01M 1/10
(52) U.S. Cl. .......................... 210/168; 210/188; 210/232; 210/416.5; 210/428; 123/196 A
(58) Field of Search .......................... 210/168, 188, 210/232, 248, 416.5, 428, 435, 436; 123/196 A

(56) References Cited

U.S. PATENT DOCUMENTS

| | | | | | |
|---|---|---|---|---|---|
| 4,036,755 | A | * | 7/1977 | Dahm et al. | 210/168 |
| 4,151,823 | A | * | 5/1979 | Grosse et al. | 123/196 A |
| 5,256,280 | A | * | 10/1993 | Anderly et al. | 210/130 |
| 5,951,857 | A | * | 9/1999 | Osborne | 210/167 |
| 6,019,717 | A | * | 2/2000 | Herman | 210/168 |
| 6,245,232 | B1 | * | 6/2001 | Craft | 210/168 |

FOREIGN PATENT DOCUMENTS

| | | |
|---|---|---|
| DE | 9411212 | 9/1994 |
| DE | 19737699 | 3/1999 |
| DE | 19961579 | 10/2001 |
| EP | 0612549 | 8/1994 |
| GB | 2287199 | 9/1995 |

OTHER PUBLICATIONS

Copy of the EPO search report of 01116468.8–2311, Generated Oct. 24, 2001.

* cited by examiner

Primary Examiner—David A. Simmons
Assistant Examiner—Fred Prince
(74) Attorney, Agent, or Firm—Crowell & Moring LLP

(57) ABSTRACT

An assembly for an internal combustion engine comprising an oil filter in a first housing structure 11 and, for instance, an oil separator in a second housing structure 12. The two housing structures can be combined to form a modular assembly. The assembly includes duct structures 20, 21 which are combined to form a common line segment 22 to reduce the material and manufacturing costs for the assembly. The different duct structures may include, for example, an oil drain 20 for the oil filter, which simplifies service (changing the filter element). The duct structure of the second housing structure can serve, for example, to transport crankcase gases to an oil separator in the second housing structure or to return separated oil from the oil separator to an engine crankcase. The oil drain of the oil filter housing may be combined with the drain the oil from the oil pan of the internal combustion engine, and the two drains may optionally be closed by a single drain plug.

12 Claims, 2 Drawing Sheets

STRUCTURAL ASSEMBLY WITH AN OIL FILTER FOR AN INTERNAL COMBUSTION ENGINE

BACKGROUND OF THE INVENTION

The invention relates to an assembly for an internal combustion engine, which comprises at least one oil filter and a second housing structure. Such an assembly is known, for instance, from DE 94 11 212. This assembly is the oil filter of an internal combustion engine in which the housing structure is formed by the housing of the oil filter and the second structure is the internal combustion engine itself. The oil filter is provided with a replaceable filter element. Since the housing structure of the oil filter is oriented horizontally, the residual oil remaining in the housing must be drained prior to filter replacement to ensure drip-free removal of the filter element. To this end, a separate drain plug is provided at the geodetically lowest area of the housing and must be opened prior to filter removal.

The drain plug generates extra work during production and installation of the filter as well as during replacement of the filter element. This has the drawback of reducing the economic efficiency of the proposed solution.

SUMMARY OF THE INVENTION

It is therefore the object of the invention to provide an assembly for an internal combustion engine with an oil filter, an oil drain and a second housing structure which functions in a simple manner.

Another object of the invention is to provide an assembly with an oil filter for an internal combustion engine which is cost-effective to be produce.

These and other objects are achieved in accordance with the present invention by providing an oil filter assembly for an internal combustion engine comprising a first housing structure which houses an oil filter in which an exchangeable filter element is installed such that lubricating oil of the internal combustion engine flows through the filter element, said first housing structure having an oil drain which can be unblocked when the filter element is removed from the oil filter; and a second housing structure including a duct structure for conveying fluids contained in an oil circuit of the internal combustion engine; wherein the oil drain of the first housing structure and the duct structure of the second housing structure open into one another and join to form a common line segment.

The assembly according to the invention comprises a first housing structure and a second housing structure. These housing structures are combined. They may also be designed as part of the internal combustion engine. For instance, one housing structure can be formed by the oil pan of the internal combustion engine. The first housing structure accommodates the oil filter; the second housing structure contains at least one duct structure that is suitable for conveying the fluids within the oil circuit. The fluids in the oil circuit, of course, include the lubricating oil itself as well as crankcase gases that pass from the combustion chambers of the cylinders into the crankcase.

The invention provides that the oil drain of the oil filter and the duct structure provided in the second housing structure open into one another so that a common line segment for the duct structures is created. This reduces the complexity of the overall construction. Simpler structures are created, which on the one hand provide increased design freedom in the configuration of the assembly and on the other hand are easier to manufacture. Duct structures in particular, because they are hollow spaces, require extra production steps to produce them, and thus involve additional cost, which can be minimized by combining the ducts.

One embodiment of the invention provides that the duct structure in the second housing structure be formed by a drain line for the lubricating oil on the oil pan of the internal combustion engine. This drain line is used in an oil change when the used lubricating oil must be removed from the lowest possible point of the internal combustion engine. The drain line may be sealed, e.g., by a sealing element, particularly a drain plug. If the drain duct of the oil filter is configured accordingly, it can be sealed by this sealing element at the same time. Opening the sealing element thus unblocks the drain line both for the lubricating oil from the oil pan and for the oil from the filter housing at the same time. In an oil change, this eliminates the additional step of emptying the filter housing prior to filter replacement, which is generally done at the same time as the oil change. This also saves time in an oil change.

Another option to seal the drain line of the oil filter is to arrange a pressure-operated stop valve. This valve may comprise, for instance, a valve body in the form of a plate which acts like a leaf spring. As soon as oil pressure builds up on the pressure side of the oil filter, the stop valve closes, so that there is no short circuit to the oil pan. During an oil change, however, the oil circuit is in an unpressurized state, so that the stop valve is open. Thus, as soon as the oil is being drained from the oil pan, the filter housing also drains. The described stop valve is simple to manufacture and increases the design freedom in the configuration of the various drain ducts.

Another embodiment of the invention provides that the duct structure be formed by an inlet duct for conveying crankcase gases. This inlet duct connects the crankcase to an oil separator, where the gases are cleaned and released either to the environment or to the intake system of the internal combustion engine. This duct can be simultaneously used to ensure return of oil residues from the housing of the oil filter. The common line segment from the inlet duct for crankcase gases and from the oil drain of the filter then extends from the junction of the two lines to the crankcase. Thus the assembly advantageously comprises the oil filter and the oil separator for the crankcase gases and can be constructed as a module. Overall, this provides cost savings in both production of the assembly and in its installation.

Another possibility to integrate the oil drain of the filter is to combine it with the return duct of the oil separator, which is intended for the oil separated from the crankcase gases. This essentially achieves the above-described advantages. Of course, the return duct and the inlet duct of the oil separator can also be produced as a single duct structure. This further enhances the degree of integration of the assembly and thereby increases the economic efficiency of the apparatus.

Integrating the oil separator and oil filter in a single module makes it possible, in particular, to save installation space. This advantage can be used especially if the oil separator and/or the oil filter have an elongated or oval cross section. This makes it possible to adapt the oil separator/oil filter more closely to the associated filter housing of the module so that the overall structural dimensions are reduced.

The oil drain provided in the oil filter also permits the filter housing to be arranged with the central axis of the filter element in an inclined or horizontal (i.e., non-vertical)

orientation. The resulting volumes which cannot be drained through the regular oil outlet of the filter housing, are emptied automatically through the oil drain during filter replacement. Drip-free removal of the filter element is thus independent of its installation position. This affords greater design freedom in the arrangement of the filter within the engine compartment of the internal combustion engine.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
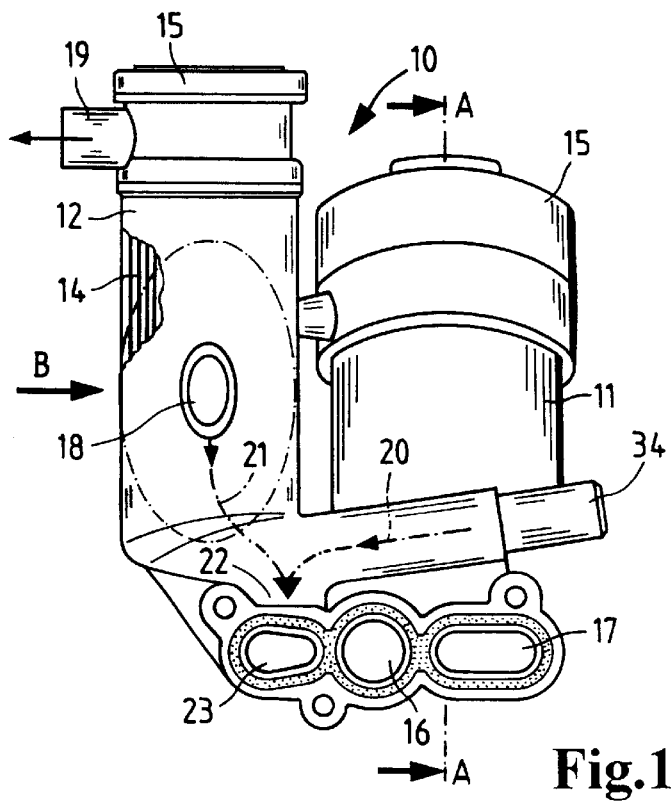
FIG. 1 is a side elevational view of a module comprising an oil separator and an oil filter.

FIG. 1 shows a module 10 comprising a first housing structure 11 as an oil filter and a second housing structure 12 as an oil separator. The first housing structure is provided with a filter element 13 (cf. FIG. 2) and the second housing structure 12 with a separator element 14. These elements can be replaced by unscrewing the covers 15 from the housing structures 11, 12. The oil filter is provided with an oil inlet 16 and an oil outlet 17. The oil separator has an inlet duct 18 for crankcase gases from the crankcase and a crankcase gas outlet 19. A further connection 34 for the crankcase from the cylinder head is connected to an oil drain 20.

The dashed arrows indicate the course of the oil drain 20, which leads out of the first housing structure, and of a return duct 21 for the oil separated in the oil separator, which leads out of the second housing structure. Both open into a common line segment 22, which leads to a connection port 23 on the module.

The second housing structure 12 with the separator element 14 has an oval cross-section. The depicted view shows the narrow side of the housing structure. The viewing direction B, which is also indicated in FIG. 1, illustrates the viewing direction in which the second housing structure is seen in its widest dimension (broken line).

Figure 2:
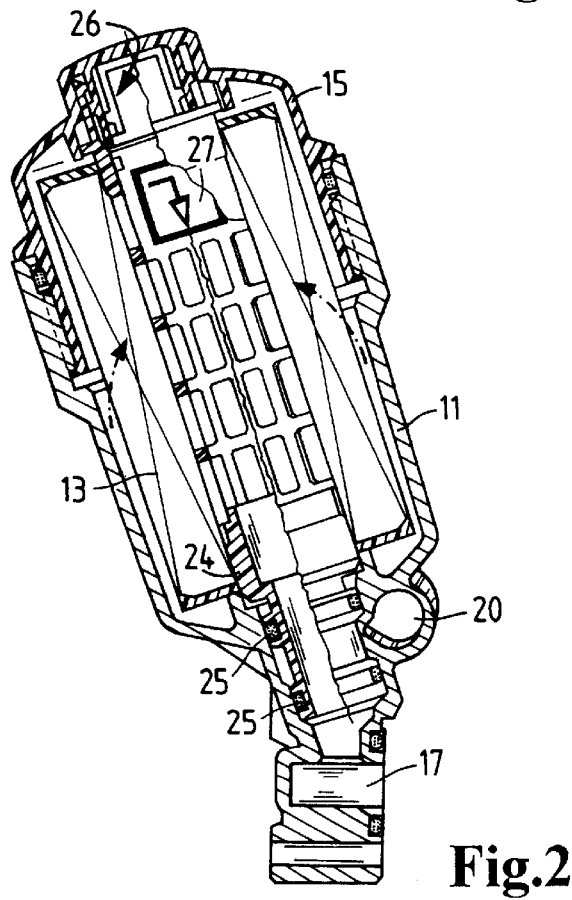
FIG. 2 is a cross section of the oil filter along line A—A in FIG. 1.

FIG. 2 shows the construction of the first housing structure 11 with the filter element 13. The housing structure 11 is closed by the sealed threaded cover 15. In the interior of the housing structure, the filter element is placed onto a central tube 24, which simultaneously seals the oil drain 20 via 0-rings 25. When cover 15 is unscrewed, center tube 24 is taken along via a snap connection 26, so that the oil drain 20 is opened. The central tube simultaneously represents the filtered side of the filter, the interior of which is connected to the oil outlet 17. Also accommodated in the central tube is a schematically illustrated bypass valve 27, which opens to maintain oil flow if the pressure increases due to clogging of the filter. In this embodiment, the filter element 13 is shown with its central axis inclined at an acute angle relative to the vertical. Oil residues which due to the orientation of the filter housing cannot drain through oil outlet 17, can nevertheless drain through oil drain 20 when the filter is to be changed.

Figure 3:
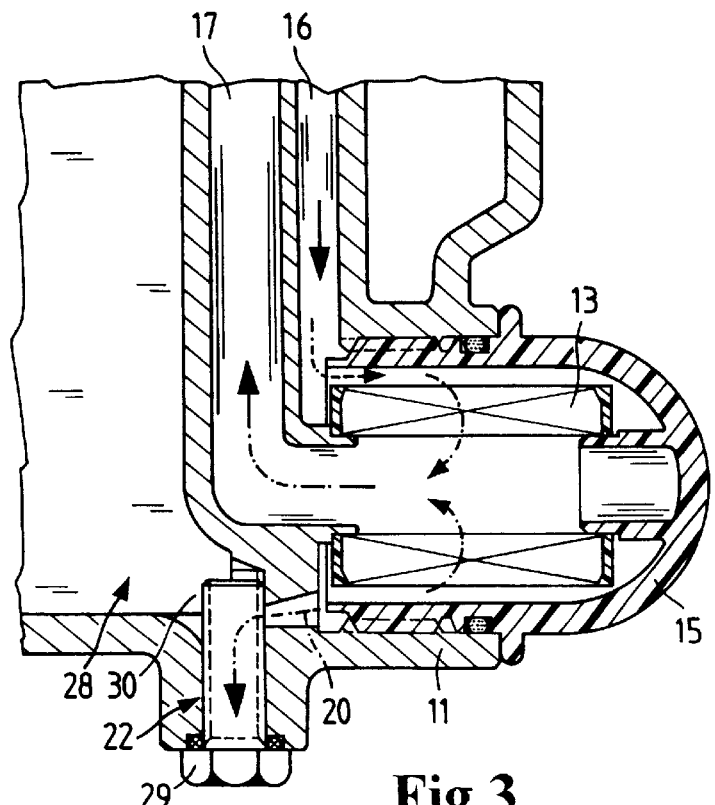
FIG. 3 is a cross section of an oil filter installed horizontally on the oil pan of an internal combustion engine.

FIG. 3 is a cross section through a horizontally installed filter element 13. An oil pan 28, which may be regarded as a second housing structure, carries a seat for the filter element as a first housing structure 11, which forms a part of the oil pan. This seat is closed by the sealed cover 15, so that the filter element is held in its installed position. The first housing structure has an oil inlet 16 and an oil outlet 17. The oil drain 20 is sealed by a plug which acts as a sealing element 29 and which simultaneously seals a drain line 30 for changing the oil. The oil drain 20 and drain line 30 thereby open into the common line segment 22. Unscrewing the sealing element 29 thus allows oil to drain both from the oil pan 28 and from the filter housing structure 11.

Figure 4:
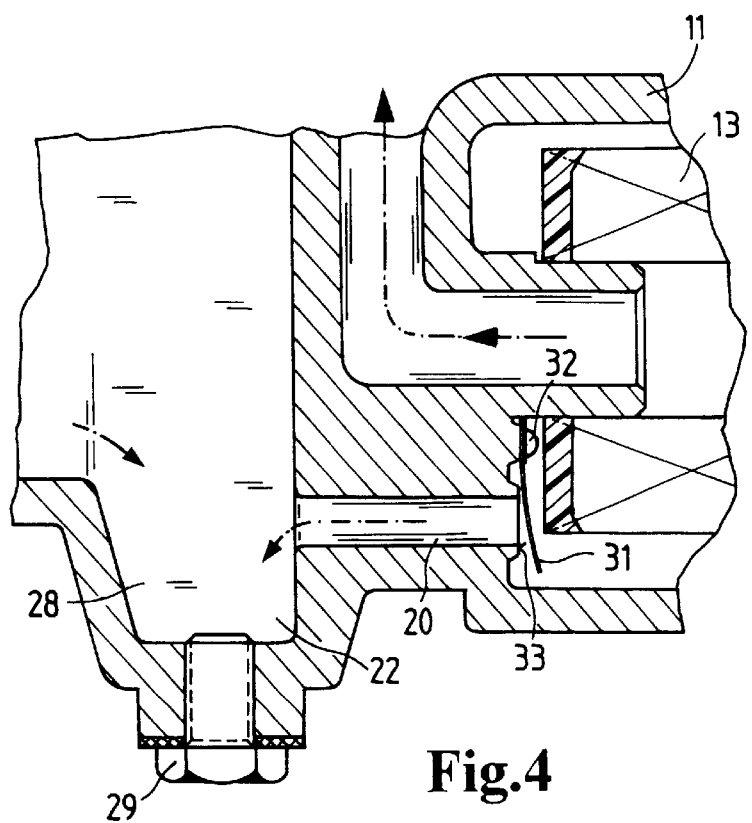
FIG. 4 is a detail view according to FIG. 3 with a modified oil drain.

In FIG. 4, the sealing element 29 is used only for the oil pan 28. The oil drain 20 is sealed by a stop valve 31, which is comprised of a resilient plate. This disk is fixed inside the cast aluminum housing by means of a rivet 32. When the oil circuit is in an unpressurized state, the stop valve is not closed. When pressure builds up inside the housing structure 11, the pressure pushes the plate of the stop valve against a valve seat 33 causing the valve to close and preventing a short circuit between the lubricating oil to be filtered and the oil pan. When the oil is being changed, the oil system is unpressurized, and the stop valve is therefore open. To remove the oil from the oil pan 28 and the housing structure 11, it is therefore sufficient to simply open the sealing element 29.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An oil filter assembly for an internal combustion engine comprising a first housing structure which houses an oil filter in which an exchangeable filter element is installed such that lubricating oil of the internal combustion engine flows through the filter element, said first housing structure having an oil drain which can be unblocked when the filter element is removed from the oil filter; and a second housing structure including a duct structure for conveying fluids contained in an oil circuit of the internal combustion engine; wherein the oil drain of the first housing structure and the duct structure of the second housing structure open into one another and join to form a common line segment.

2. An assembly according to claim 1, wherein the duct structure in the second housing structure comprises a drain line for an oil pan of the internal combustion engine for draining lubricating oil from the oil pan.

3. An assembly according to claim 2, wherein the common line segment is provided with a sealing element which seals both the oil drain of the first housing structure and the oil pan drain line of the second housing structure.

4. An assembly according to claim 1, wherein the oil drain of the first housing structure is provided with a pressure operated stop valve which is open when the oil filter is unpressurized.

5. An assembly according to claim 1, wherein the duct structure in the second housing structure comprises a return duct for returning oil separated from crankcase gases of the internal combustion engine to a crankcase of the internal combustion engine.

6. An assembly according to claim 1, wherein the duct structure of the second housing structure comprises an inlet duct for conveying crankcase gases from a crankcase of the internal combustion engine to an oil separator.

7. An assembly according to claim 6, wherein the duct structure of the second housing structure further comprises a return duct for returning oil separated from crankcase gases of the internal combustion engine to the internal combustion engine crankcase.

8. An assembly according to claim 6, wherein the oil separator and the oil filter are combined into a modular assembly which can be mounted on the internal combustion engine.

9. An assembly as claimed in claim 6, wherein the second housing structure comprises the oil separator, said second housing structure having an oval cross sectional configuration which is filled by a mating oil separator element installed therein.

10. An assembly according to claim 1, wherein the filter element has a central axis and is installed in the first housing structure with said central axis in a non-vertical orientation.

11. An assembly according to claim 10, wherein the filter element is installed with said central axis oriented horizontally.

12. An assembly according to claim 10, wherein the filter element is installed with said central axis inclined at an acute angle to vertical.

* * * * *